United States Patent Office 3,508,232
Patented Apr. 21, 1970

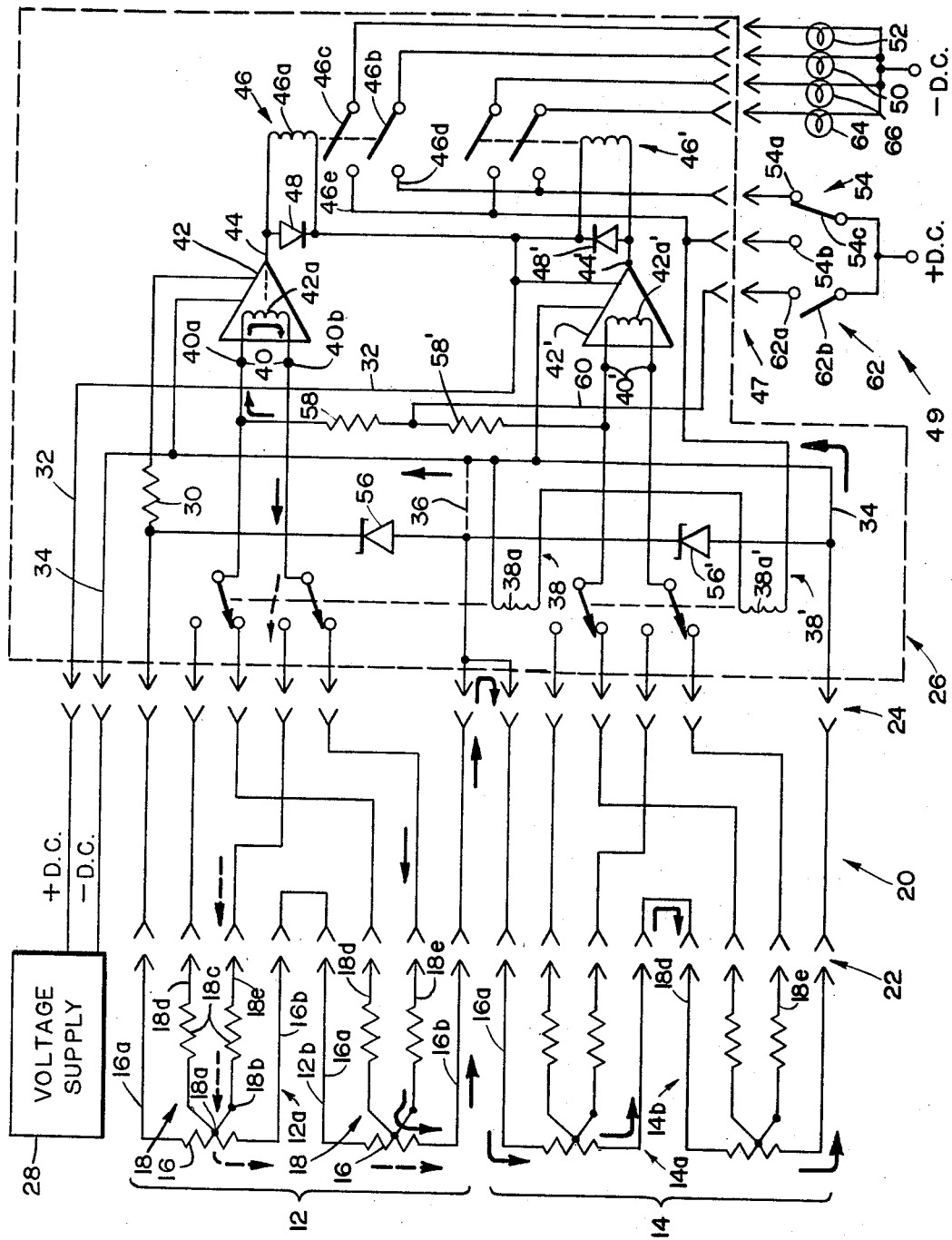

3,508,232
ELECTRICAL MONITORING SYSTEM HAVING READY PERFORMANCE TESTING CAPABILITY
Sidney B. Williams, Lexington, and Vernon C. Westcott, Lincoln, Mass., assignors to Trans-Sonics, Inc., Lexington, Mass.
Filed Jan. 6, 1967, Ser. No. 607,722
Int. Cl. H04q 9/00
U.S. Cl. 340—214  3 Claims

ABSTRACT OF THE DISCLOSURE

A performance testing capability is provided for an electrical system that monitors a physical condition with a sensor operating an output device when a selected condition is sensed. The test signal is applied in parallel with the sensor signal and actuates the output device only when a first path, including the sensor and its interconnections with the output device, and a second path through the elements of the output device are both intact.

BACKGROUND

This invention relates to an electrical condition-monitoring system having a readily-operated performance testing capability. In particular, it provides an improved test capability for a monitoring system wherein a sensor operates an output device when the sensor is exposed to a selected physical condition. The sensor and the components of the output device are often in separate locations. With the present test capability, at any time during the monitoring operation, the operator can ascertain that all components of the system are properly interconnected and that essentially all are operating normally. The test capability does not materially increase the system cost, size, weight or bulk.

The invention is illustrated in a system that monitors the supply of engine lubricating oil in aircraft. It is, of course, of utmost importance that an aircraft engine have an adequate supply of lubricating oil. Should the lubrication cease, the engine is subject to immediate failure. Frequently, upon failure the engine flies apart, causing serious if not catastrophic damage to the aircraft.

Briefly, the oil monitoring system for an aircraft engine illustratively includes one or more sensors in the oil reservoir, which is located near the engine. A detector generally located elsewhere in the aircraft processes the signal from each sensor. When it receives a "low-oil" signal, the detector operates an indicator lamp mounted in the cockpit instrument panel. Multiconductor cables interconnect the sensor, detector and lamp.

In spite of the criticality of lubrication to an aircraft engine, the general practice is to provide the pilot with only the facility for checking the output indicator, i.e. the lamp, of such an oil monitoring system. This elementary test requires an additional switch to apply a test signal to each lamp. Additional test facilities have not been provided because of the added weight of the equipment which heretofore was deemed necessary to implement further testing.

Thus, except for the lamps, prior oil monitoring systems of the foregoing type can not be checked during flight or even as part of a last minute pre-takeoff check. Instead, effective checking requires disassembling the system.

Moreover, the prior lamp check often introduces a further component of limited reliability which has to operate correctly in order to realize even the oil-monitoring operation. This is because the switch added to apply the lamp testing signal often removes the sensor signal from the lamp during the test. Accordingly, a failure in this switch, particularly in its sensor-signal contacts, could completely disable the monitoring system.

It is an object of this invention to provide an improved electrical condition-monitoring system capable of an essentially instantaneous performance check of at least the major portion of the system.

A further object of the invention is to provide such a monitoring system that has relatively light weight and small size. In particular, the provision of the performance check capability should introduce minimum additional weight and bulk to the monitoring system.

Another object of the invention is to provide performance checking capability of the above character in a monitoring system wherein the condition sensor is remote from the output indicator.

A further object of the invention is that the provision of the foregoing performance checking capability in a monitoring system not diminish the system reliability.

It is also an object of the invention to provide a monitoring system of the above character capable of being checked at any time and, further, that automatically resumes monitoring operation immediately after the check.

Other objects of the invention will in part be obvious and will in part appear hereinafter.

The invention accordingly comprises the features of construction, combination of elements, and arrangement of parts exemplified in the construction hereinafter set forth, and the scope of the invention is indicated in the claims.

SUMMARY OF INVENTION

As noted above, the invention provides a readily-checked condition-monitoring system employing a sensor and output device that produce an alarm indication when the sensor signal identifies a selected condition. The illustrated sensor has a sensing element and an excitation element. The two elements are electrically in circuit with each other in such a way that the sensing element output current normally does not pass through the excitation element. Conversely, the excitation element normally does not introduce a significant signal into the sensing element. The excitation element is connected across an electrical supply and the sensing element is connected to apply its output signal, a voltage responsive to the condition being sensed, to the output device.

The output device includes a current amplifier connected to the sensor. It operates an alarm device, illustratively through a relay, when the sensor current identifies the selected condition.

To check the performance of the system, a test current is applied to the amplifier inputt erminals in parallel with the sensor signal. The test signal is derived from a supply having the same return conductor as the current applied to the sensor excitation element.

When the monitoring system is operating properly, the test current traverses an input test path through the monitoring system to the common return conductor. In particular, it passes through the amplifier input circuit, the portion of the sensing element between the amplifier and the connection of the sensing element to the excitation element. The test current continues through the excitation element to the return conductor.

Provided the input test path, the amplifier, the alarm device and the connections between them are not defective, the test current operates the amplifier to actuate the alarm device. Thus, the performance check turns on the alarm device only when all the tested components of the monitoring system are properly connected and functioning substantially properly. (A few seldomly-encountered defects are not sensed.)

The test current is applied to the monitoring system in such a way that it does not interrupt any monitioring circuits. Further, except when in use, the circuit for applying the test current has no effect on the monitoring system. In particular, the test current is applied to the input test path in parallel with the sensor-detector connections, rather than in series, which would require disconnecting the sensor from the detector. With the parallel arrangement, a failure in the apparatus that applies the test signal will either have no effect on the normal monitoring operation or it will operate the "low-oil" alarm device, thereby notifying the pilot of a malfunction. A malfunction in a circuit for applying test signal in series, on the other hand, can interrupt the monitoring operation but produce normal test operation so that the malfunction is not detected.

BRIEF DESCRIPTION OF DRAWING

For a fuller understanding of the nature and objects of the invention, reference should be had to the following detailed description taken in connection with the accompanying drawing, which is a schematic representation of a monitoring system embodying the invention.

DESCRIPTION OF THE PREFERRED EMBODIMENT

The sensor

The system illustrated in the drawing monitors the level of lubricating oil for two aircraft engines with a pair of sensors 12 disposed in the oil reservoir of a first engine and a pair of sensors 14 in the oil reservoir of the second engine. The sensors 12a is above the sensor 12b. Thus, the former sensor detects the presence of oil at an upper level and the latter sensor detects the presence of oil at a lower level. The sensors 14a and 14b are similarly arranged.

The sensor 12a comprises a resistive heating element 16 and a thermocouple 18 having a hot junction 18a and a cold junction 18b. The distributed resistances of the different conductors forming the thermocouple 18 are indicated with the lumped resistors 18c. The hot junction 18a is secured to the heating element 16 at an essentially point contact; the two thermocouple conductors forming the hot junction can simultaneously be welded together and to the heating element to form the junction and at the same time bond it to the heating element. The cold junction 18b is spaced from the heating element and hence assumes substantially the temperature of its environmental fluid. With this arrangement, relatively little of the thermocouple signal passes to the heating element and the heating element introduces a relatively negligible voltage drop in the thermocouple circuit.

During operation of the sensor 12a, a current impressed through its heating element 16 produces heat that is applied directly to the thermocouple hot junction 18a. When the oil immerses the sensor 12a, both the junctions 18a and 18b are immersed. The oil removes sufficient heat from the hot junction 18a to maintain its temperature close to the temperature of the oil and hence of the cold junction 18b. Accordingly, the thermocouple output voltage, developed in signal leads 18d and 18e, is relatively small.

On the other hand, when the oil is below the level of the sensor 12a, both its junctions are exposed to the vapor above the oil. The temperature of the hot junction 18a then rises substantially above the temperature of the cold junction 18b, which is close to the temperature of the vapor. Hence, the thermocouple develops a significant output voltage at its leads 18d–18e.

The sensor 12a thus produces a voltage corresponding to the temperature differential it senses with the thermocouple 18, and the heating element 16 is in effect an exciting element used in developing the temperature differential. In the illustrated system, this voltage indicates whether the oil level is above or below the sensor.

The other sensor 12b in the pair 12 is identical with the sensor 12a. The leads from the two sensors are connected to a cable 20 by way of a multicontact connector 22. The cable 20 and connector 22 also connect the heating elements 16—16 of the two sensors 12a and 12b in series, as shown. The other end of the cable 20 is connected by another connector 24 to a signal processing detector indicated generally at 26. In addition, a voltage supply 28 applies a direct voltage to the detector 26 through the connector 24.

The detector

With further reference to the drawing, within the detector 26, the lead 16a of the sensor 12a is connected through a current limiting resistor 30 to the positive supply line 32. The heater element lead 16b from the other sensor 12b is connected through the heater elements of the other sensor pair 14 to the negative supply line 34. Where the sensor pair 14 is omitted, as in a single-engine aircraft, this connection from the sensor 12b lead 16b to the negative line 34 could be made with the dashed line connection 36 shown in the detector 26.

Also in the detector 26, a double-pole, double-throw relay 38 having a coil 38a normally applies the output signal from the low level sensor 12b to the input terminals 40 of an amplifier 42. The illustrated amplifier is a magnetic amplifier having an input winding 42a connected between the terminals 40.

The amplifier 42 also receives operating power from the supply 28 and develops an output signal at an output terminal 44 relative to the supply line 32. This signal is applied to the coil 46a of a double-pole, double-throw relay 46. A diode 48 connected across the relay coil 46a eliminates the effect of transients when current to the coil 46a is interrupted.

Each movable contact 46b and 46c of the relay 46 is connected, through another connector 47, to one side of a lamp 50, 52, respectively, in a panel-mounted control unit indicated generally at 49. The other side of each lamp is connected to the return conductor of the supply 28. In addition, the relay fixed contacts 46d and 46e are similarly connected to fixed terminals 54a and 54b respectively of a panel-mounted single-pole, double-throw level-selector switch 54. The movable contact 54c of this switch is connected to the positive terminal of the supply 28.

Monitoring operation

When the switch 54 is in the low-level position shown, it applies the supply voltage to the relay fixed contact 46d. Also, the relay 38 is not energized and its movable contacts are in the position shown. Accordingly, the signal leads 18d and 18e of the low-level sensor 12b are connected to the amplifier 42. So long as the oil immerses the sensor 12b, the thermocouple 18 therein develops a voltage that is too small to cause the amplifier 42 to operate the relay 46. Accordingly, the relay 46 remains in the de-energized position shown, and the lamps 50 and 52 associated with the sensor pair 12 remain off.

When the oil level drops below the sensor 12b, the resultant temperature differential between its junctions causes it to develop a substantially larger voltage. In response, the amplifier 42 energizes the relay coil 46a to engage the movable contacts 46b and 46c with the fixed contacts 46d and 46e, respectively. The switch 54 applies the supply voltage to only the fixed contact 46d and accordingly only the lamp 50 comes on to inform the aircraft pilot of the low-oil condition, the other lamps remain off.

When the pilot moves the switch 54 from the low-level position shown to the high-level position where the movable contact applies the supply voltage to the fixed contact 54b, the voltage is delivered to the relay coil 38a and to the relay fixed contact 46e. The relay 38 accordingly switches and applies the signal from the high-level sensor 12a to the amplifier input terminals 40. Should the oil level be below this sensor, the resultant sensor signal will operate the amplifier 42 to energize the relay 46, and the lamp 52 associated with this sensor is turned on. The lamp 50 now remains off.

The sensor pair 14

With further reference to the drawing, the sensor pair 14 is preferably identical to the sensor pair 12 and is arranged in a circuit identical to the circuit described above connected with the sensor pair 12. Further, the heating elements 16 in the sensor pair 12 are in series with the series-connected heating elements of the sensor pair 14.

The detector 26, therefore, also includes a second double-pole, double-throw relay 38' having a coil 38a' in parallel with the relay coil 38a. Similarly, there is a second amplifier 42', the output of which energizes a relay 46'.

Rest of detector circuit

As shown in the drawing, the detector 26 also includes two Zener diodes 56 and 56' that deliver heater current to one sensor pair in the event an open circuit develops in the heater current path through the other sensor pair. The Zener diode 56 is connected between the lead 16a of the sensor 12a and the lead 16b of the sensor 12b; the diode 56' is similarly connected between the corresponding leads of the sensor pair 14. Each Zener diode is thus in parallel with the two series-connected heating elements of one pair of sensors. The diodes 56–56' are arranged to be back biased by the supply voltage applied to the sensors. Further, the Zener breakdown voltage of each diode is somewhat greater than the voltage drop the heater current develops across the two series-connected heating elements in parallel with it. Accordingly, the Zener diodes normally are not conductive.

However, in the event that the heating element 16 in the sensor 12a, for example, burns out or otherwise develops an open circuit, the heater current to all four sensors is interrupted. But now the voltage across the Zener diode 56 exceeds its Zener breakdown value and this diode conducts on its Zener characteristic. The conducting Zener diode then delivers heater current to the heating elements in the sensor pair 14. As a result, the failure in the sensor pair 12 does not disable the sensor pair 14. Further, due to the nature of the Zener characteristic of the diode 56, the current through sensor pair 14 is only slightly less than normal. That is, the sensor pair 14 receives nearly the same current as when the sensor pair 12 was intact.

The performance check circuit

Except for the Zener diodes 56 and 56', every component of the monitoring system described so far is normally used in the two-level monitoring system having no built-in performance checking capability. The only components added to the monitoring system for the performance check are two resistors 58 and 58', a single-pole, single-throw test switch 62 in the unit 49 and a conductor 60 connecting the resistors to the switch.

The switch 62, a normally-open, push-to-close switch, is connected between the conductor 60 and the positive supply terminal. The resistor 58 is in series between the other end of the conductor 60 and one input terminal of the amplifier 42. In particular, the resistor connects to the amplifier input terminal 40a that is connected more directly to a thermocouple hot junction than to a cold junction. That is, for reasons discussed below, the series path from the amplifier terminal 40a connected to the resistor 48 and traversing the amplifier winding 42a (or other input element), passes through the cold junction 18b before reaching the hot junction 18a.

The other resistor 58' is also connected from the conductor 60 to the corresponding input terminal 40a' of the amplifier 42'. The resistance of each resistor 58, 58' is preferably considerably greater than the input resistance of each amplifier 42, 42'. This is readily attained with the illustrated magnetic amplifiers, for they have relatively low input resistances.

When the test switch 62 is open, as shown, the resistors 58 and 58' have essentially no effect on the operation of the monitoring system.

However, when the switch 62 is closed, the supply voltage normally produces a test current in each resistor 58, 58'. As indicated with the solid-line arrows, from the resistor 58, at least part of this test current normally follows an "input test" path that successively passes through the magnetic amplifier input winding 42a, a pair of engaged contacts on the relay 38, the connector 24, the cable 20 and the connector 22 to the signal lead 18e of the sensor 12b. The test current continues through the cold junction of this sensor, and at the hot junction thereof enters its heating element 16. From the lead 16b of sensor 12b, the test current continues back through the connector 22, the cable 20, the connector 24, back again through the connector 24, cable 20 and connector 22 to the series-connected heating elements in the sensor pair 14. From the lead 16b of that sensor pair, the test current again traverses the connector 22 to still another conductor in the cable 20 and another pair of connected contacts of the connector 24. The current then returns to the return line 34 in the detector 26.

Thus, in order for the test current to follow this input test path between the supply terminals, the two parts of each connector 22, 24 and 47 must be properly mated, the cable 20 must be intact and, further, the portion of the sensor 12b in the path, the heating elements of the sensor pair 14 and the amplifier winding 42a must be intact. With these parts of the system in working order, the test current in the winding 42a is of sufficient magnitude to operate the relay 46 and hence turns on the low-level lamp 50.

Moreover, in order for the test current in the winding 42a to cause the lamp 52 to glow, the "output test" path through the amplifier, relay 46, connector 47 and lamp must also be intact and the elements thereof functioning properly.

In the event there is an open circuit in either test path, as would result from one of the connectors 22, 24 or 47 being disassembled or having a faulty contact, from burnout in the sensor 12b, or from burnout in one of the heating elements in the sensor pair 14, the lamp 50 will not come on when the test switch 62 is closed. Similarly, should the amplifire 42, relay 46 or lamp 50 be defective, the lamp will remain off, thereby informing the pilot that a malfunction is present.

As soon as the test switch 62 is released or otherwise opened, the system resumes the normal monitoring operation.

With further reference to the drawing, when the test switch 62 is closed with the switch 54 in the position shown, in addition to the portion of the test current directed to the amplifier input coil 42, another portion can travel to the relay 38 contact to which the resistor 58 is connected, across the connector 24, the cable 20 and the connector 22 to the signal lead 18d of the sensor 12b. There this second portion of the test current joins the first portion and leaves the sensor on the lead 16b. This path from the resistor 58 to the sensor 12b lead 18d does not function in the performance test. That is, an open circuit that is only in this path would not interrupt the test current in the input test path and hence would no be detected. However, it is very unlikely that a defect will exist in this short path without a corresponding defect in the parallel portion of the input test path.

When the movable contact 54c of the switch 54 is engaged with the switch contact 54b at the time the test switch 62 is closed, the resultant test current through the resistor 58 follows a second input test path. This path is identical to the input test path described above and indicated with the solid arrows except that from the contacts of relay 38 to the sensor 12b heating element 16, it follows the path indicated with dashed arrows. That is, assuming there are no open circuits, with the switch 54 reversed, test current travels through the amplifier winding 42a, across the contacts of the relay 38, the connectors 22, 24 and the cable 20 to the signal lead 18e of the sensor 12a. From this lead, the test current goes through the sensor cold junction, at least part of its hot junction, to its heating element 16 and on to its lead 16b. The test current leaves the sensor 12a by way of the connector 22 and returns to the lead 16a of the sensor 12b, again to the connector 22. From there the test current goes through the heating element of the sensor 12b and then follows the same input test path described above to the return line 34.

The high-level lamp 52, associated with the sensor 12b, is turned on by this test current only when the components in this second input test path are intact, the amplifier 42, relay 46 and lamp are in working order, and the connector 47 is properly assembled.

With further reference to the drawing, when the test switch 62 is closed, the resistor 58' applies test current to the monitoring circuit associated with the sensor pair 14 along the test paths substantially identical to the two described above with reference to the sensor pair 12.

Accordingly, a low level lamp 64 associated with the sensor 14b comes on simultaneously with the low level lamp 50 when the switch 62 is depressed and the switch 54 is in the position shown, provided the test paths are operative. Similarly, when the switch 54 is moved from the position shown to its other position, the two high-level lamps 52 and 66 associated with the sensors 12a and 14a, respectively, are simultaneously illuminated when the test switch 62 is closed and the test paths are operative.

The addition of the two resistors 58 and 58', the conductor 60 and the test switch 62 to the monitoring system thus enables one to test essentially all the components of the monitoring system at any time. Only a part of each sensor, a few conductors in the cable 20, and the Zener diodes 56 and 56' (used only in event of heating element burnout) are not tested. An analysis of the failures that occur in a monitoring system of the illustrated type, and verified by experience, indicates that there is a small likelihood that these few components of the monitoring system that are not tested can experience a disabling failure without a similar failure being introduced into one of the components that is tested. Thus, the test current applied in the foregoing manner verifies the operating capability of essentially all components of the monitoring system. Yet it requires a relatively negligible addition to the cost, weight or bulk of the system. Moreover, the performance testing is done in a minimum amount of time and with a minimal interruption of the normal operation of the monitoring system. Also, the pilot can test his oil supply just before takeoff, during flight, and at other critical times.

It should also be noted that the present circuit also detects certain short circuit defects. For example, it will generally detect a short circuit between the signal leads 18d and 18e of any sensor and of sufficiently low resistance so that the thermocouple signal is shunted from amplifier. In this instance, the short circuit will also shunt the test signal from the amplifier and apply it directly to the sensor so that no alarm indication is produced with the test switch depressed.

Having described the invention, what is claimed as new and secured by Letters Patent is:

1. In electrical apparatus for monitoring a physical condition and having a signal-producing sensor (12a) in circuit with output means (26, 49), said sensor producing an output signal at least equal to a threshold magnitude only when exposed to a selected physical condition and said output means developing an output manifestation only when it receives from said sensor a signal at least equal to said threshold value, the improvement comprising:
   (A) circuit means (58, 60, 62) connected with said sensor and said output means and selectively operable in a first condition to apply to said output means, in parallel with the signal from said sensor, a test current at least equal to said threshold value,
   (B) means forming a supply terminal (32),
   (C) a return conductor (34),
   (D) a second condition sensor (12b) producing an output signal at least equal to said threshold value only when exposed to a selected physical condition, in which each sensor has
      (1) a condition-sensing element (18) producing said output signal, and
      (2) an electrical exciting element (16) arranged to energize said sensing element and normally having a first resistance, said exciting elements of said first and second sensors being arranged in series with each other between said supply terminal and said return conductor, and
   (E) first and second electrical breakdown elements (56, 56') each of which
      (1) is in parallel with the exciting element of one sensor,
      (2) carries a first current when the exciting element connected therewith has said first resistance, and
      (3) conducts a second current substantially greater than said first current when the exciting element connected therewith has a resistance in excess of said first value.

2. Apparatus according to claim 1 in which each of said first and second electrical elements is a Zener diode.

3. Electrical apparatus for monitoring a physical condition comprising:
   (A) at least two signal-producing condition sensors,
   (B) output means associated with each sensor, each said output means developing an output manifestation only when the signal from the associated sensor exceeds a predetermined value,
   (C) an electrical exciting element associated with each sensor, all said elements being connected together in series,
   (D) a current source for energizing the exciting elements, and
   (E) an electrical breakdown element,
      (1) in parallel with each exciting element,
      (2) carrying a first current when the associated exciting element has a first resistance, and
      (3) conducts a second current substantially greater than the first current when the associated exciting element has a resistance in excess of the first value so that if one exciting element burns out, the associated breakdown element breaks down so that sufficient current flows through the remaining exciting element to maintain them in their excited state.

References Cited

UNITED STATES PATENTS

| | | | |
|---|---|---|---|
| 2,731,627 | 1/1956 | Herbst | 340—214 X |
| 2,820,218 | 1/1958 | Lovegrove | 340—214 X |
| 3,118,136 | 1/1964 | Steele | 340—244 |
| 3,301,055 | 1/1967 | Williams et al. | 340—244 X |

JOHN W. CALDWELL, Primary Examiner

D. L. TRAFTON, Assistant Examiner

U.S. Cl. X.R.

340—228, 244

UNITED STATES PATENT OFFICE
CERTIFICATE OF CORRECTION

Patent No. 3,508,232                                          April 21, 1970

Sidney B. Williams et al.

It is certified that error appears in the above identified patent and that said Letters Patent are hereby corrected as shown below:

In the drawing, an electrical connection should be shown between resistor 30 and electrical lead 32. Column 2, line 53, "inputt" should read -- input --. Column 3, line 2, "monitioring" should read -- monitoring --; line 32, "sensors" should read -- sensor --. Column 5, line 69, "48" should read -- 58 --. Column 6, line 48, "amplifire" should read -- amplifier --; line 67, "no" should read -- not --.

Signed and sealed this 5th day of January 1971.

(SEAL)
Attest:

Edward M. Fletcher, Jr.                      WILLIAM E. SCHUYLER, JR.
Attesting Officer                                     Commissioner of Patents